(12) United States Patent
Kaushik et al.

(10) Patent No.: US 10,437,813 B2
(45) Date of Patent: Oct. 8, 2019

(54) SELF-HEALING OF LAYER METADATA WITHIN A LAYERING SYSTEM

(71) Applicant: Dell Products L.P., Round Rock, TX (US)

(72) Inventors: Puneet Kaushik, Fremont, CA (US); Rushikesh Patil, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 568 days.

(21) Appl. No.: 15/011,977

(22) Filed: Feb. 1, 2016

(65) Prior Publication Data

US 2017/0220420 A1    Aug. 3, 2017

(51) Int. Cl.
*G06F 16/23* (2019.01)
*G06F 16/27* (2019.01)
*G06F 11/07* (2006.01)
*G06F 11/14* (2006.01)

(52) U.S. Cl.
CPC ...... *G06F 16/2365* (2019.01); *G06F 11/0751* (2013.01); *G06F 11/1435* (2013.01); *G06F 16/23* (2019.01); *G06F 16/278* (2019.01); *G06F 2201/82* (2013.01)

(58) Field of Classification Search
None
See application file for complete search history.

(56) References Cited

U.S. PATENT DOCUMENTS

| | | | | |
|---|---|---|---|---|
| 7,844,582 B1* | 11/2010 | Arbilla | ............... | G06F 21/554 707/694 |
| 8,006,125 B1* | 8/2011 | Meng | ............... | G06F 11/1417 714/6.2 |
| 8,380,676 B1* | 2/2013 | Eastham | ......... | G06F 17/30085 707/662 |
| 8,825,597 B1* | 9/2014 | Houston | ............... | H04L 67/06 707/610 |
| 8,954,663 B1* | 2/2015 | Klein | ............... | G06F 3/0619 711/111 |
| 9,020,987 B1* | 4/2015 | Nanda | ............... | G06F 16/21 707/821 |
| 9,043,280 B1* | 5/2015 | Patwardhan | ........ | G06F 11/1446 707/640 |
| 2005/0246612 A1* | 11/2005 | Leis | ............... | G06F 11/0727 714/763 |
| 2009/0300020 A1* | 12/2009 | Chen | ............... | G06F 21/6218 |
| 2011/0184912 A1* | 7/2011 | Baptist | ............... | G06F 11/1448 707/639 |
| 2014/0019498 A1* | 1/2014 | Cidon | ............... | G06F 17/3007 707/827 |
| 2015/0248434 A1* | 9/2015 | Avati | ............... | G06F 16/184 707/615 |

* cited by examiner

*Primary Examiner* — Charles D Adams
(74) *Attorney, Agent, or Firm* — Kirton McConkie; Brian Tucker (57) ABSTRACT

Layer metadata within a layering system can be self-healed. When a layer is mounted, a scanning module can scan the file system structure of the layer to identify what content is stored on the layer as well as attributes of this content. Based on this scan, the scanning module can determine if the layer metadata is consistent with the actual contents of the layer and report any discrepancies to a healing module. The healing module can then repair the layer metadata so that it accurately reflects the contents of the layer.

20 Claims, 12 Drawing Sheets

SELF-HEALING OF LAYER METADATA WITHIN A LAYERING SYSTEM

CROSS-REFERENCE TO RELATED APPLICATIONS

N/A

BACKGROUND

The present invention is generally directed to the self-healing of layer metadata within a layering system. A layering system is a tool that enables an operating system, user applications, and user data to be layered on the user's computing device. When using a layering system, layered applications and data are executed natively on the user's computing device without the use of a virtual machine or other sandboxed execution environment. This native execution will therefore cause the layered applications to appear, both to the user and to other applications, as if they were being executed in a "normal" manner. This is in contrast to many types of virtualization techniques such as terminal services and application virtualization where it is typically clear that the applications are executed in a separate environment.

U.S. patent application Ser. Nos. 14/719,248 and 14/719,256 are both directed to a layering system and provide a background for the present invention. The content of these applications is therefore incorporated by reference. It is noted that both of these applications are commonly owned and would not constitute prior art to the present invention. Therefore, this background should not be construed as admitting prior art, but should be construed as describing various features on which the present invention is based and that may even form part of the present invention.

Figure 1:
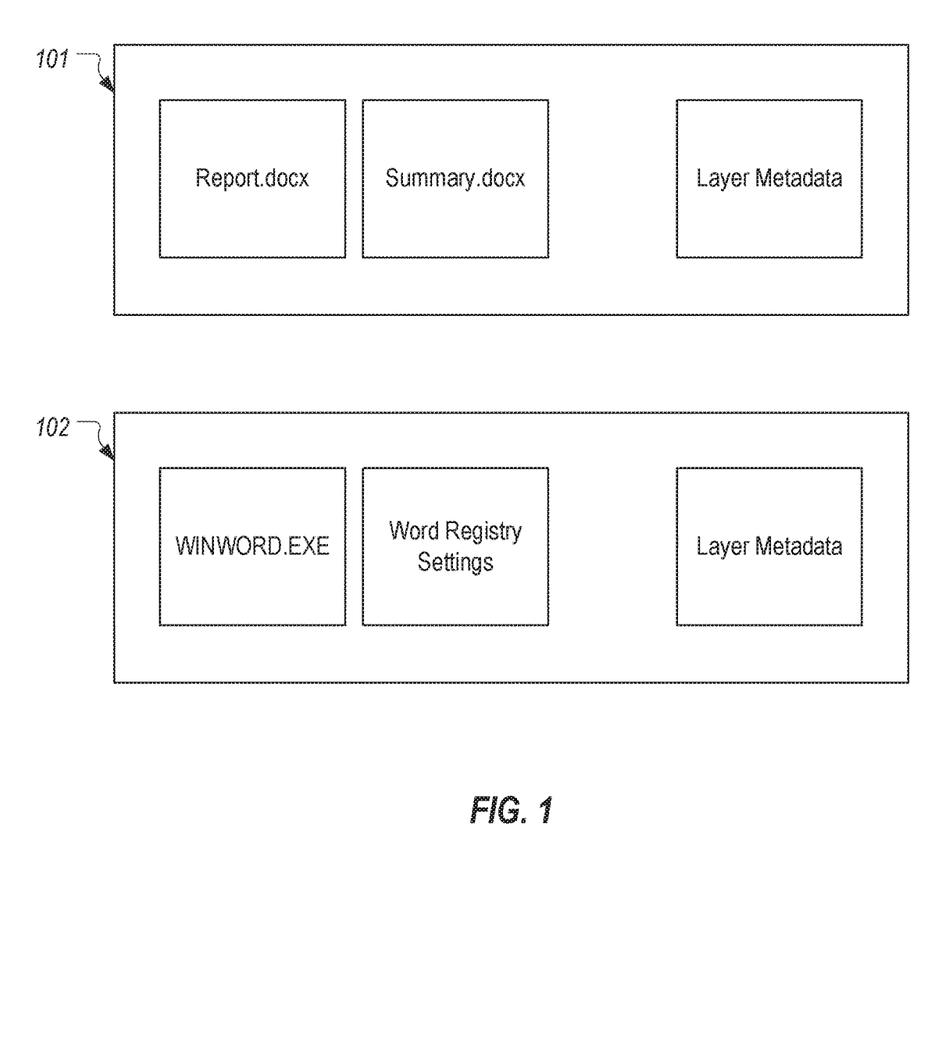
FIG. 1 illustrates simplified examples of layers of a layering system.

As is described in the '248 and '256 applications, a layer is a collection of data or resources which enables the collection to be isolated or set apart from the data or resources in another layer. To summarize this layering, FIG. 1 provides simplified examples of a user data layer 101 and an application layer 102. Each layer can be stored in a manner that allows the layer to be separately mounted for access. For example, each layer may comprise a separate partition of a disk (including of a virtual disk). The ability to separately mount a layer allows the layering system to selectively provide access to particular layers. It will be assumed that the layering system determines that user data layer 101 and application layer 102 should be mounted in response to the user logging in to a computing device on which the layering system executes or which the layering system otherwise controls.

As shown in FIG. 1 and for simplicity, application layer 102 includes a single application, WINWORD.EXE, which is the executable for Microsoft Word. Word also requires a number of registry settings to execute properly, and therefore, application layer 102 also includes such registry settings. It is noted that these registry settings, which would normally be stored within the registry of the operating system, could be stored within application layer 102 in a registry hive. Of course, a typical installation of Word would require a number of other files and/or settings which are not depicted. Application layer 102 also includes layer metadata which describes the content of application layer 102 (e.g., which describes that the layer includes WINWORD.EXE and whatever structure is used to store the Word registry settings). This layer metadata is critical because it allows the layering system to quickly determine what exists on the layer.

User data layer 101 is structured in a similar way. However, as a user data layer, it stores the user's files which in this case constitute two Word documents: Report.docx and Summary.docx. As with application layer 102, user data layer 101 may also store a number of other files including configuration files that may be particular to this user (e.g., a template file for Word). User data layer 101 also includes layer metadata which defines the content of the layer. Again, this layer metadata is critical because it allows the layering system to quickly determine what exists on the layer.

As mentioned above, a layer can be a separately mountable portion of a storage device (whether physical or virtual) such as a partition. Accordingly, when the user logs on to a computing device, the layering system can mount layers 101 and 102 so that the user will have access to MS Word and his documents which are included in these layers. However, if a different user were to log in to the same computing device, the layering system could instead mount an application layer and user data layer pertaining to the different user so that the different user can only access the applications and user data defined in those layers.

The process by which the user accesses the data and resources included on each layer is provided in the '248 and '256 applications and will not be described in detail in this specification. By way of an overview, the layering system includes a file system filter driver and a registry filter driver which can function to intercept and redirect file system and registry operations as appropriate. In particular, these filters can be registered with the OS so that they will receive all file system and registry operations respectively. If a file system or registry operation pertains to content of a layer rather than to content of the file system or registry directly provided by the OS, the filters can redirect the operation to the corresponding layer. The '248 and '256 applications provide a number of examples of this type of redirection.

The result of this redirection is that, from the user perspective, the files of the layers do not appear to be stored in a different manner than any other file would typically be stored by the OS. For example, if the user data layer 101 were assigned a partition of E:, the layering system could cause the files to appear as if they were stored in the typical C: partition. In other words, the fact that multiple partitions may be loaded is abstracted (and even hidden) from the user perspective. It is again reiterated that the use of layer metadata to define what is stored on each layer allows this process to be carried out efficiently as is described in the '248 and '256 applications.

For performance reasons, layer metadata and updates to it are cached in memory and periodically flushed to disk. However, in some cases, it may not be possible to flush the in memory version of the layer metadata which would cause the persisted layer metadata to become inconsistent. For example, if a user initiated a shutdown while the layers are mounted, the operating system's shutdown mechanism may not wait long enough for the layering system to flush the cached layer metadata. Similarly, in the event of a system crash or a cache handling issue caused by the OS, the cached layer metadata may not be flushed. When such events occur to prevent the flushing of the layer metadata, the next time the layer is mounted, the layer metadata would provide an inaccurate representation of the contents of the layer. Therefore, even though files of the layer would be present on the underlying storage device, they would not be visible to the end user.

BRIEF SUMMARY

The present invention extends to methods, systems, and computer program products for the self-healing of layer metadata within a layering system. When a layer is mounted, a scanning module can scan the layer to identify what content is stored on the layer as well as attributes of this content. Based on this scan, the scanning module can determine if the layer metadata is consistent with the actual contents of the layer and report any discrepancies to a healing module. The healing module can then repair the layer metadata so that it accurately reflects the contents of the layer.

In some embodiments, the present invention can be implemented as a method for performing the self-healing of layer metadata in a layering system. In conjunction with mounting a layer, the layer can be scanned to identify contents of the layer. The identified contents of the layer can be compared to corresponding layer metadata to thereby identify any inconsistencies in the layer metadata. The layer metadata can then be modified to correct any identified inconsistencies.

In other embodiments, the present invention can be implemented as one or more computer storage media storing computer executable instructions which when executed by one or more processors implement a method for correcting inconsistencies in layer metadata. A layer that includes content and layer metadata describing the content can be mounted. The layer can then be scanned to identify the content. The identified content can be compared to the layer metadata. One or more inconsistencies in the layer metadata can be identified. The layer metadata can then be modified to correct the one or more inconsistencies such that the layer metadata correctly describes the content of the layer.

In additional embodiments, the present invention can be implemented as a computing device that includes one or more processors; storage that is divided into a number of layers, each layer including content and layer metadata which describes the content; and a layering system for managing which layers are mounted when a user logs in to the computing device. Upon mounting a layer, the layering system is configured to scan the content of the layer and compare the content of the layer to the corresponding layer metadata. The layering system is further configured to modify the corresponding layer metadata to correct any inconsistencies between the content of the layer and the corresponding layer metadata.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the contents of a layer should be construed as encompassing not only files stored on the layer but any metadata or attributes associated with the files. For example, the contents of a layer can include file system specific content/attributes such as file and directory names, directory contents, file size, file type (e.g., hidden or archival), etc., and layering specific content/attributes such as rename targets, fake deleted files, system files, layer files and directories, etc.

Figure 2A:
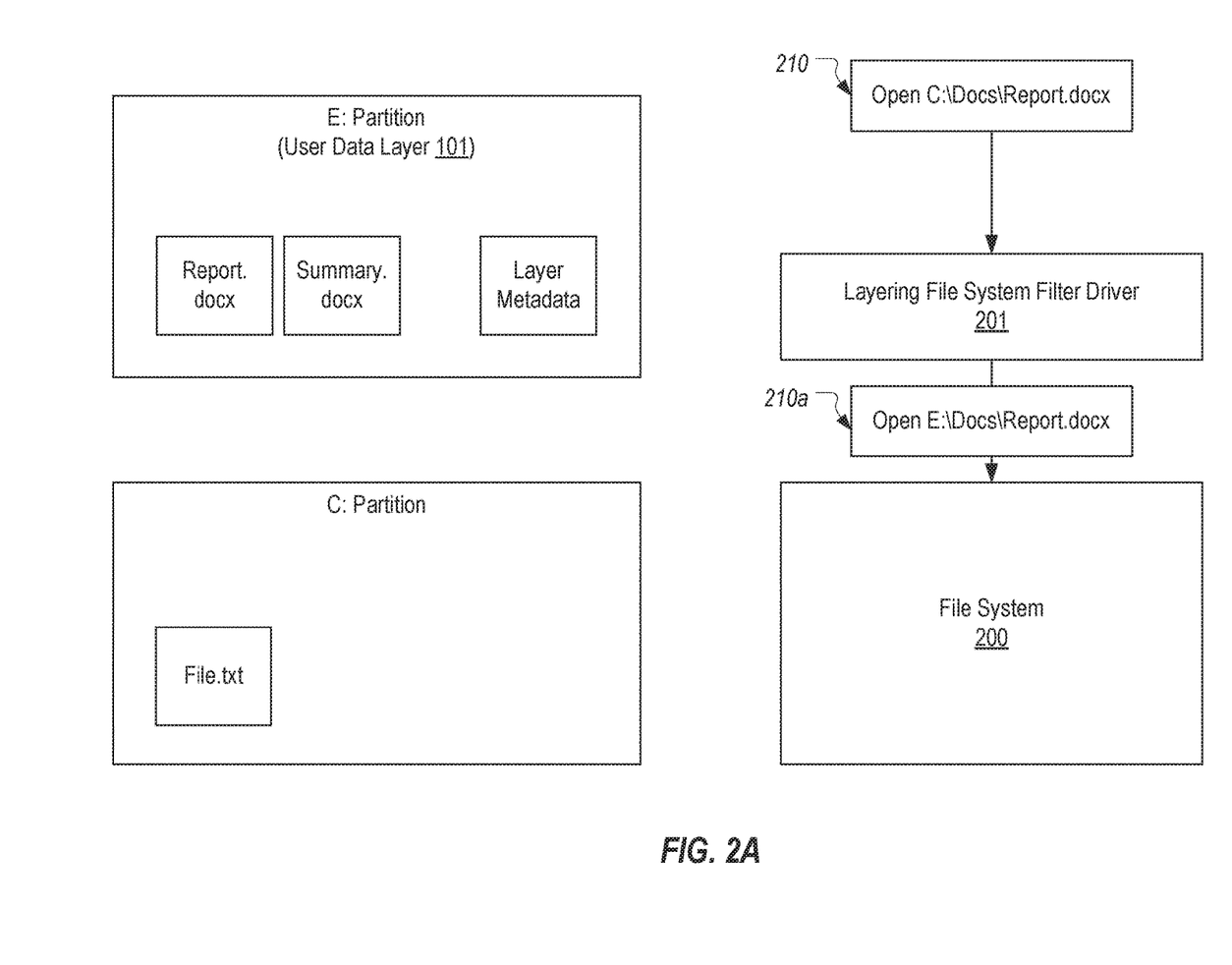
FIGS. 2A and 2B generally illustrate how a layering system can reroute file system or registry operations based on layer metadata of a mounted layer.
Figure 2B:
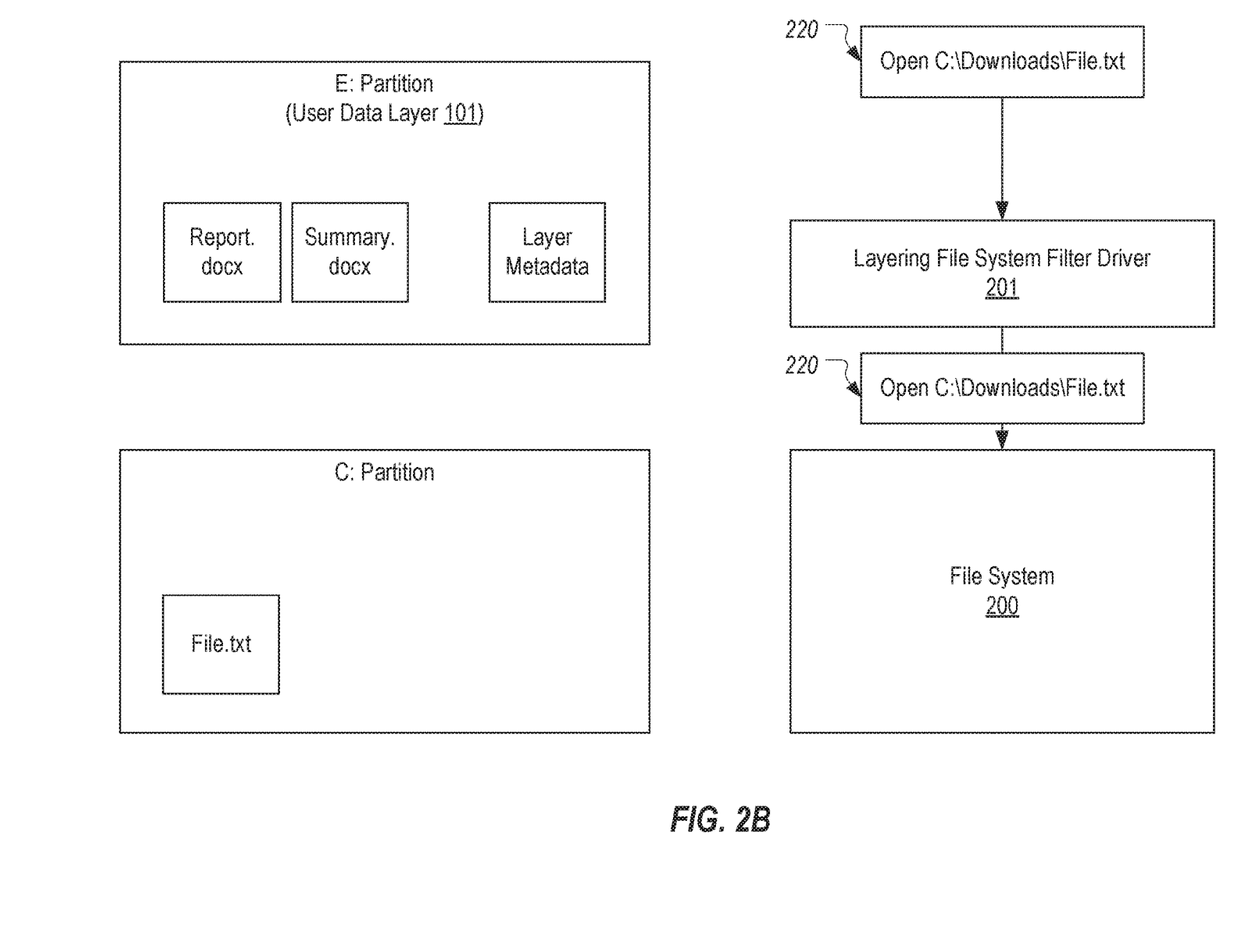

Prior to describing how the layer metadata can be self-healed, brief examples of how the layering system manages I/O will be described to provide context for the self-healing process. FIGS. 2A and 2B each illustrate an example of how the layering system can function. Each of these examples involve the layering file system filter driver (or LFFD) 201 and its role in determining whether to redirect a file open request. It is noted that a similar process would be carried out by the layering registry filter driver (or LRFD) if the operation pertained to the registry.

As shown in FIGS. 2A and 2B, it will be assumed that the operating system provides a file system 200 for handling I/O to the various mounted partitions. It will also be assumed that the operating system has mounted a C: partition and that the layering system has mounted an E: partition that corresponds to user data layer 101. In the following description, the E: partition and user data layer 101 (or simply layer) will be used interchangeably). However, it is noted that a partition is not the only structure that can be employed for a layer. It is also important to note that because the E: partition was mounted by the layering system, it will not appear in the same manner as the C: partition. In particular, the user will not be able to see the separate E: partition. Instead, the layering system may cause the contents of the E: partition to appear as if they were stored on the C: partition.

Accordingly, if the user selects to open the Report.docx file that is stored on the E: partition, a file open request 210 of C:\Docs\Report.docx may be generated. As is described in the '248 and '256 applications, LFFD 201 is registered as a filter driver for file system 200 and therefore will receive the opportunity to evaluate file open request 210. LFFD 201 can evaluate the target of file open request 210 against the layer metadata of the E: partition (and possibly against layer metadata of any other mounted layer) to determine if the request pertains to the layer. In this case, it will be assumed that the layer metadata indicates that the E: partition includes the path \Docs and that the Report.docx file is stored in the path. As a result, LFFD 201 can modify file open request 210 to create modified file open request 210a of E:\Docs\Report.docx. Modified file open request 210a is then passed to file system 200 which will open Report.docx from the appropriate location on the E: partition. LFFD 201 can perform this type of rerouting for any I/O that pertains to content stored on the E: partition. The determination of whether I/O pertains to content on a particular layer is based on the layer metadata for that particular layer.

FIG. 2B illustrates the case where LFFD 201 determines that a file open request 220 does not pertain to a layer (or at least does not pertain to a layer separate from the layer that includes the operating system). In this example, file open request 220 is directed to File.txt which is stored in a Downloads folder that is assumed to exist on the C: partition. Upon receiving file open request 220, LFFD 201 will evaluate the request against the layer metadata for the E: partition and determine that the E: partition does not include a path of \Downloads. Accordingly, LFFD 201 can allow file open request 220 to pass to file system 200 without modification since the request already includes the correct path to File.txt.

To summarize, LFFD 201 selectively modifies I/O requests so that they are directed to the appropriate layer. In the case of registry access, the LRFD would perform similar functionality to ensure that the registry access is directed to the appropriate layer. It is again reiterated that this rerouting is necessary because the layering system causes the layers to be hidden from the user's perspective while still being visible to the operating system.

Figure 3A:
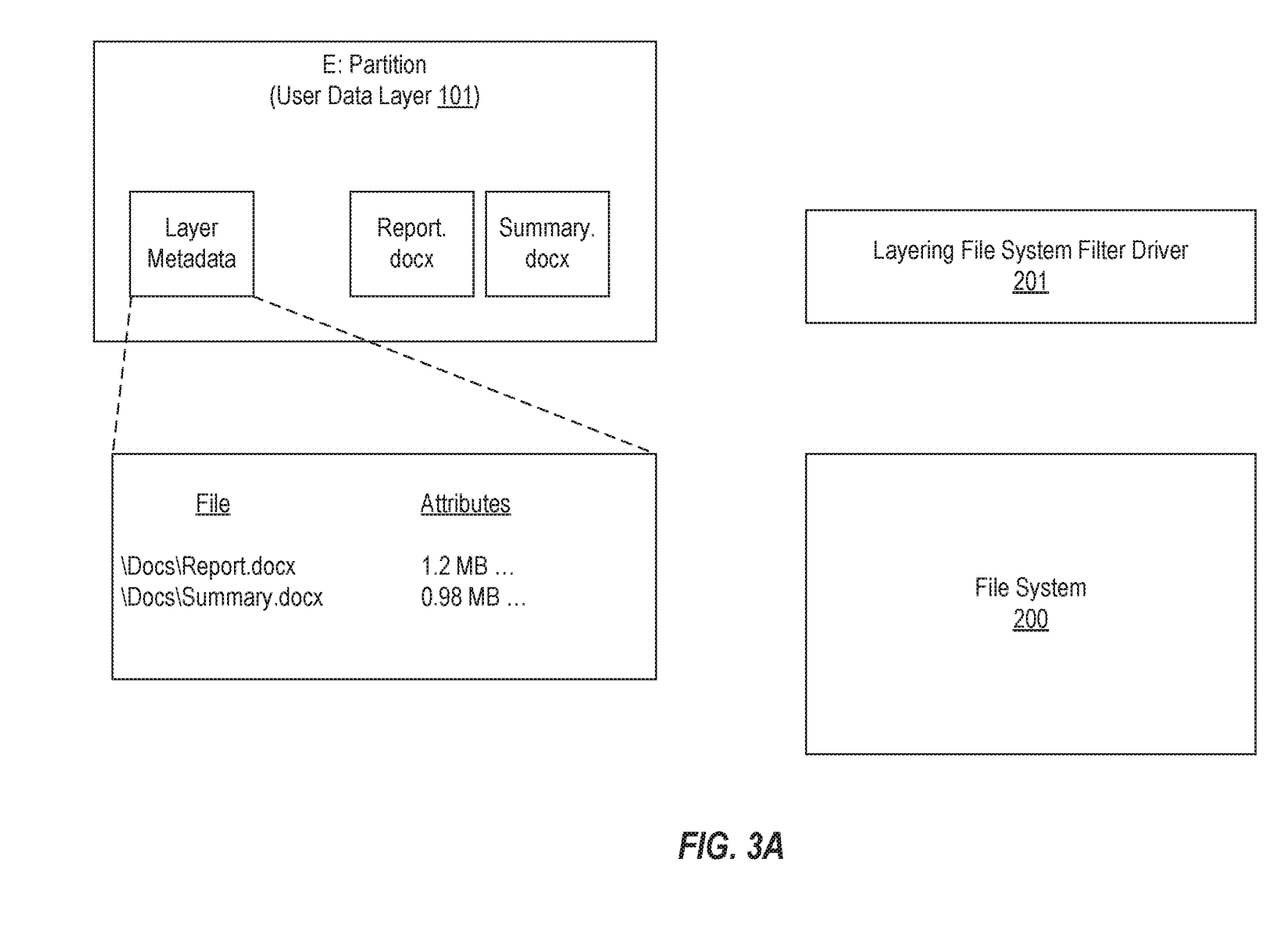
FIGS. 3A and 3B illustrate an example of how layer metadata can be updated in response to the creation of a file on a layer.
Figure 3B:
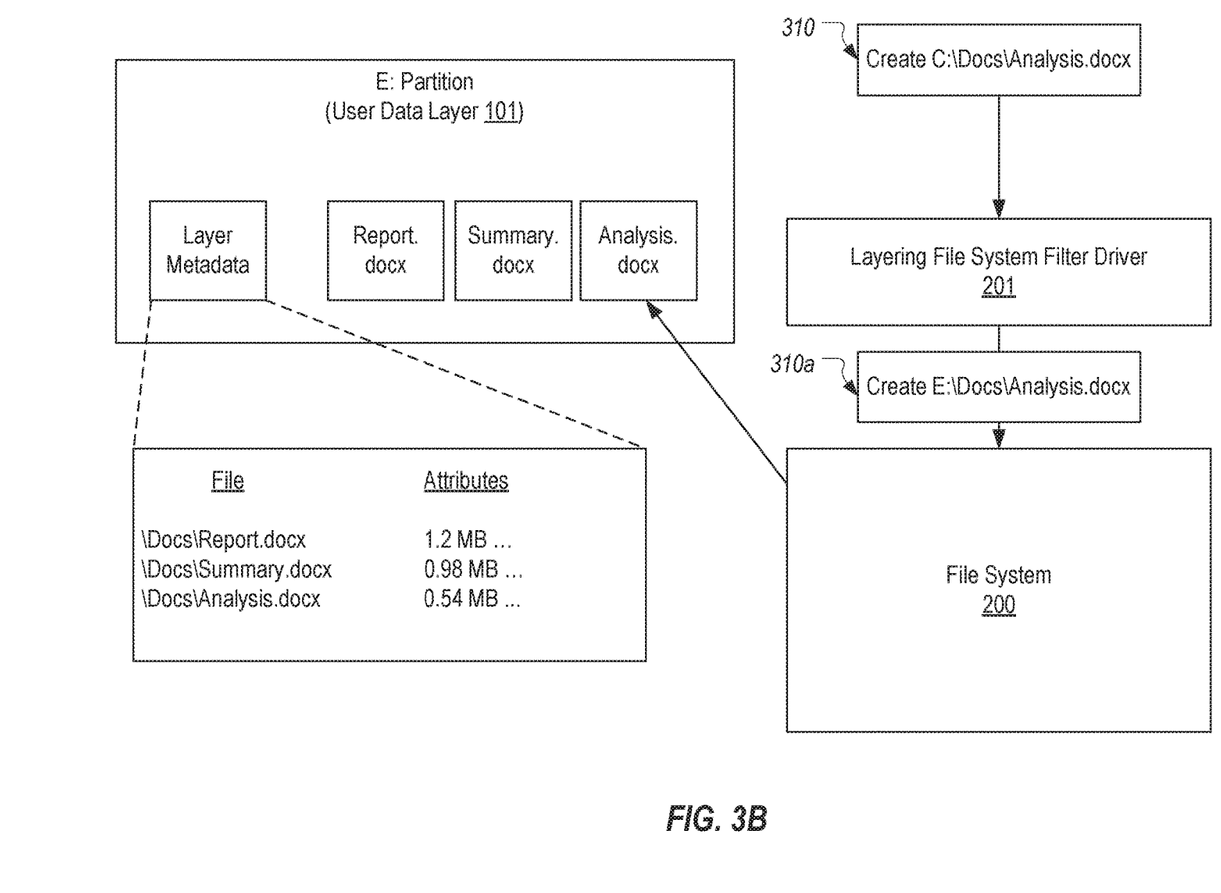

FIGS. 3A and 3B illustrate an example of how the layer metadata can be updated whenever the content of the layer is changed. In FIG. 3A, a sample of the layer metadata is depicted. In this example, the layer metadata is assumed to include an identification of each file stored on the E: partition as well as attributes of each file. For simplicity, only a file size is shown for each file. However, it is to be understood that a number of different file types and corresponding attributes could be included in the layer metadata. In some embodiments, this layer metadata could be stored in a registry hive maintained on the E: partition.

FIG. 3B illustrates how the layer metadata can be updated in response to the creation of a new file on the E: partition. As shown, a file create request 310 is received by LFFD 201. LFFD 201 can evaluate the request to determine whether it pertains to the E: partition. This evaluation can include searching through the layer metadata for the E: partition to determine whether the path \Docs appears in the layer metadata. In this case, LFFD 201 will determine that the \Docs path corresponds to a path on the E: partition and can therefore modify file create request 310 to generate modified file create request 310a that points to the E: partition. Modified create request 310a will then be passed to file system 200 which will cause the Analysis.docx file to be created on the E: partition. As part of the creation of the file, the layering system can cause the layer metadata to be updated to reflect the addition of the file to the layer. For example, file system 200 may provide a response indicating that the file was created successfully, and in response to such a response, LFFD 201 can cause the layer metadata to be updated to include an entry for the Analysis.docx file as is shown in FIG. 3B. After this, whenever the layering system presents the contents of the E: partition to the user, all three files will be displayed based on the layer metadata which identifies each file.

Figure 4A:
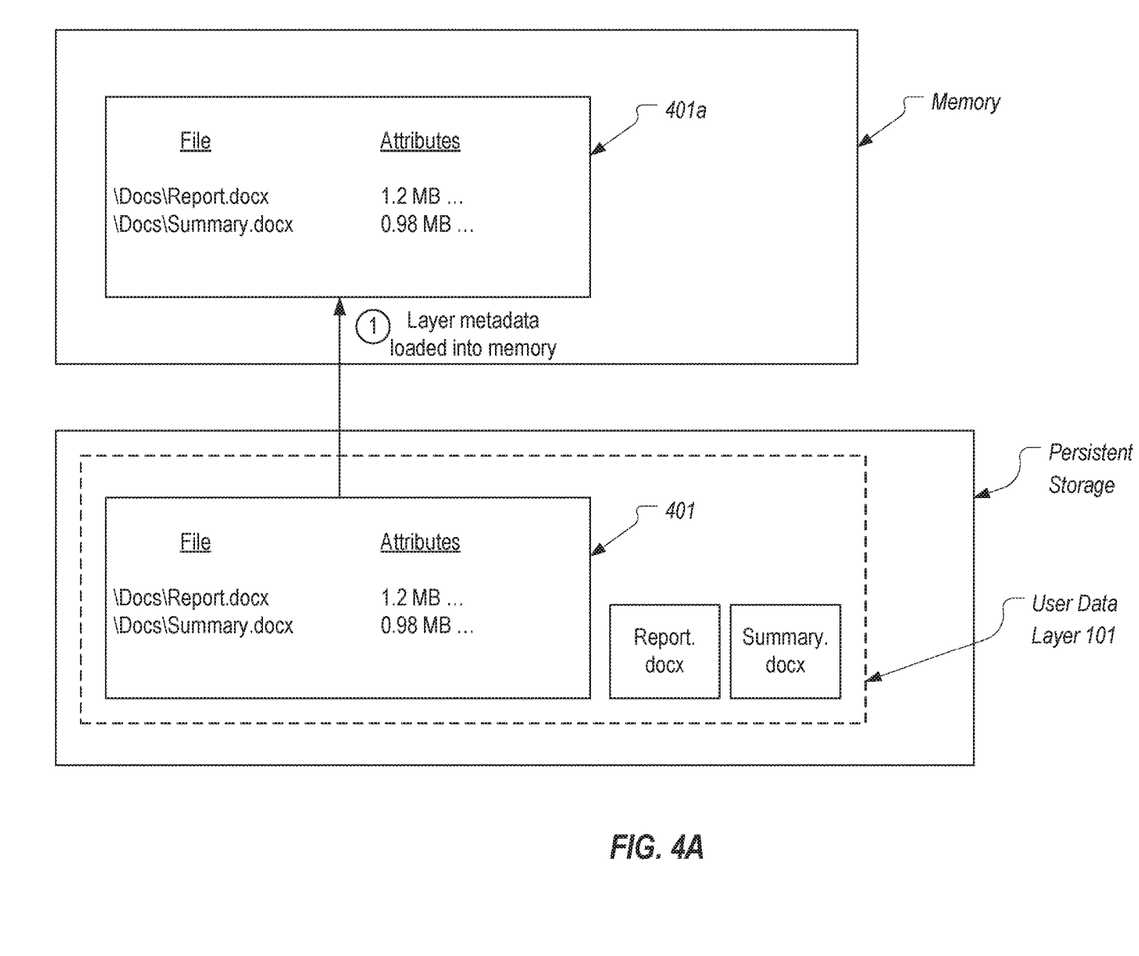
FIGS. 4A-4C illustrate an example of how layer metadata can become inconsistent.
Figure 4B:
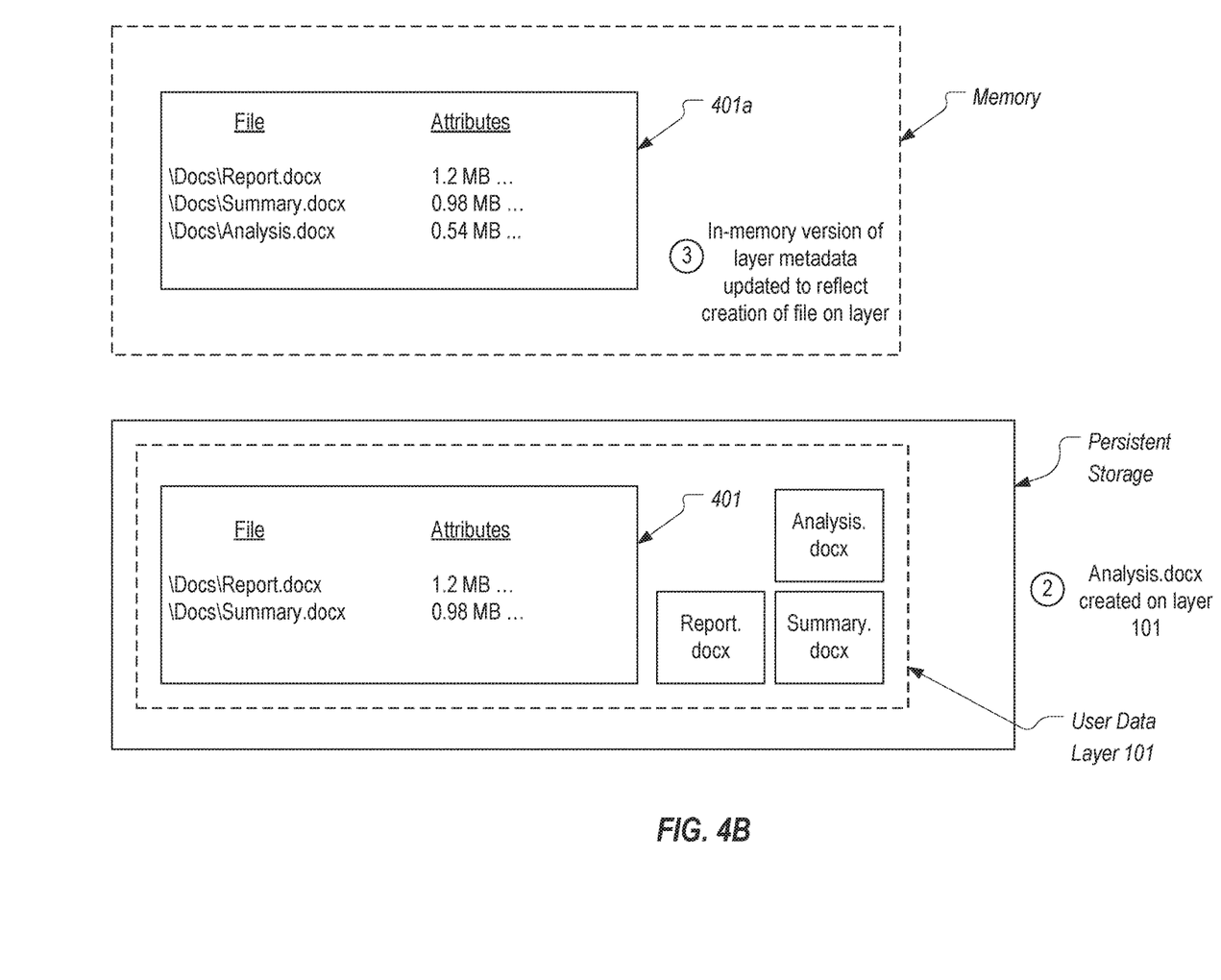
Figure 4C:
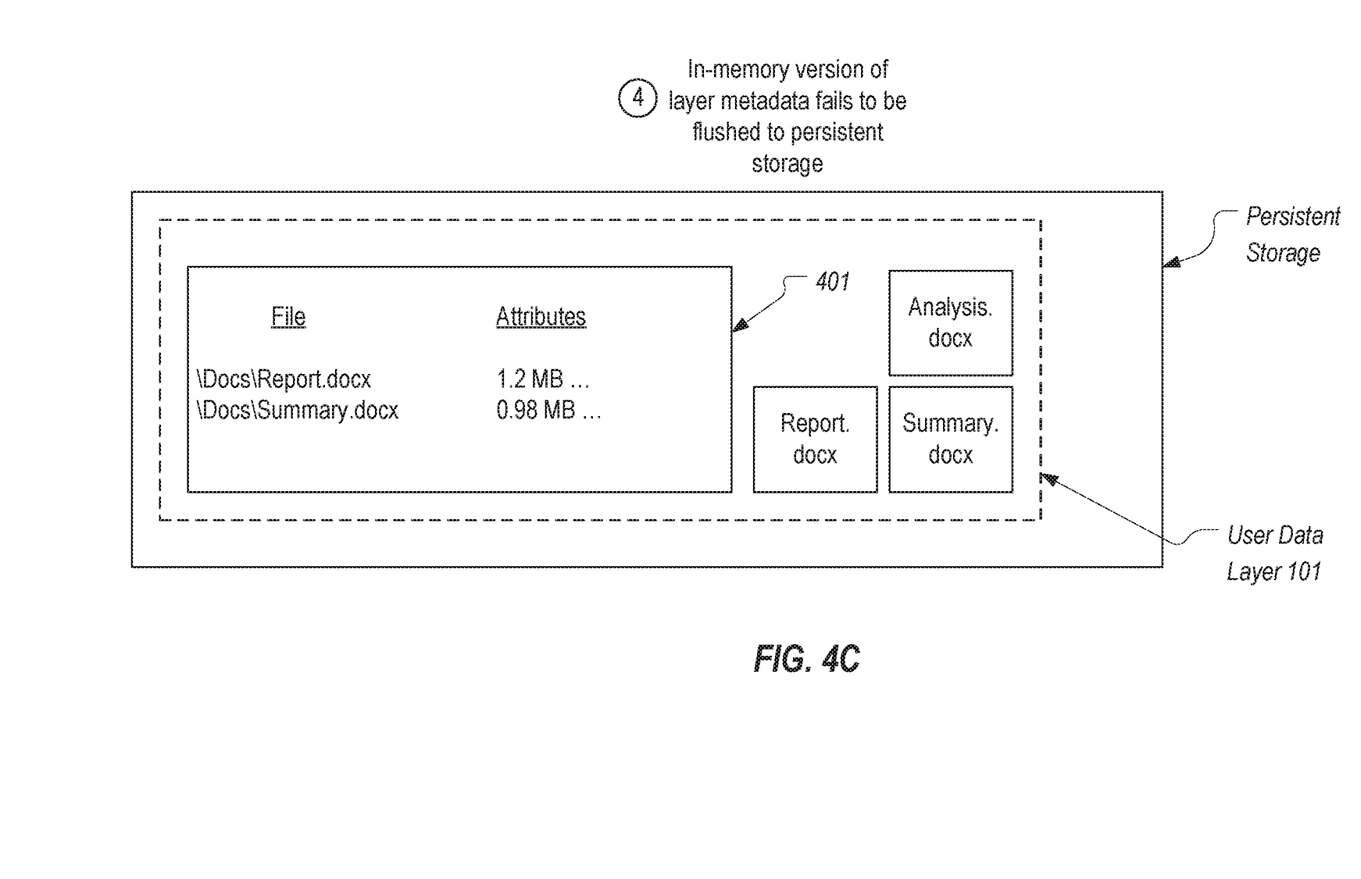

FIGS. 4A-4C illustrate how inconsistencies may arise in the layer metadata and generally correspond to the process depicted in FIGS. 3A and 3B. In FIGS. 4A-4C, user data layer 101 (or the E: partition) is shown as existing in persistent storage. User data layer 101 includes layer metadata 401. When the E: partition is mounted, layer metadata 401 will be loaded into memory creating an in-memory version 401a of the layer metadata.

FIG. 4B then shows how the in-memory version 401a can be updated when the Analysis.docx file is created in the E: partition. For efficiency reasons, in-memory version 401a can be updated to include an indication that Anaylsis.docx has been created on the layer. However, the persistent storage version 401 will remain unchanged until the in-memory version 401a is flushed to persistent storage.

Prior to the in-memory version 401a being flushed to persistent storage, something occurs that prevents the updates made to the in-memory version 401a from being persisted to the persistent storage version 401 of the layer metadata. Accordingly, FIG. 4C illustrates that persistent storage version 401 of the layer metadata indicates that only two files are stored on the layer even though in reality three documents are now stored on the layer. Layer metadata 401 therefore does not accurately represent the contents of the layer. Therefore, without the techniques of the present invention, the next time user data layer 101 is loaded, the layering system would indicate the presence of the Report-.docx and Summary.docx files but would not indicate the presence of the Analysis.docx file since the layering system presents a view of the layer that is dictated by layer metadata 401.

It is noted that this is only one type of inconsistency that may occur. Other inconsistencies that may occur include the existence of an entry in the layer metadata for a file that does not exist, the existence of a missing or incorrect file attribute, the existence of a rename target that does not exist, the existence of incorrect directory metadata, etc. Of course, this should not be construed as an exhaustive list of the types of inconsistencies that may be addressed by the present invention.

Figure 5A:
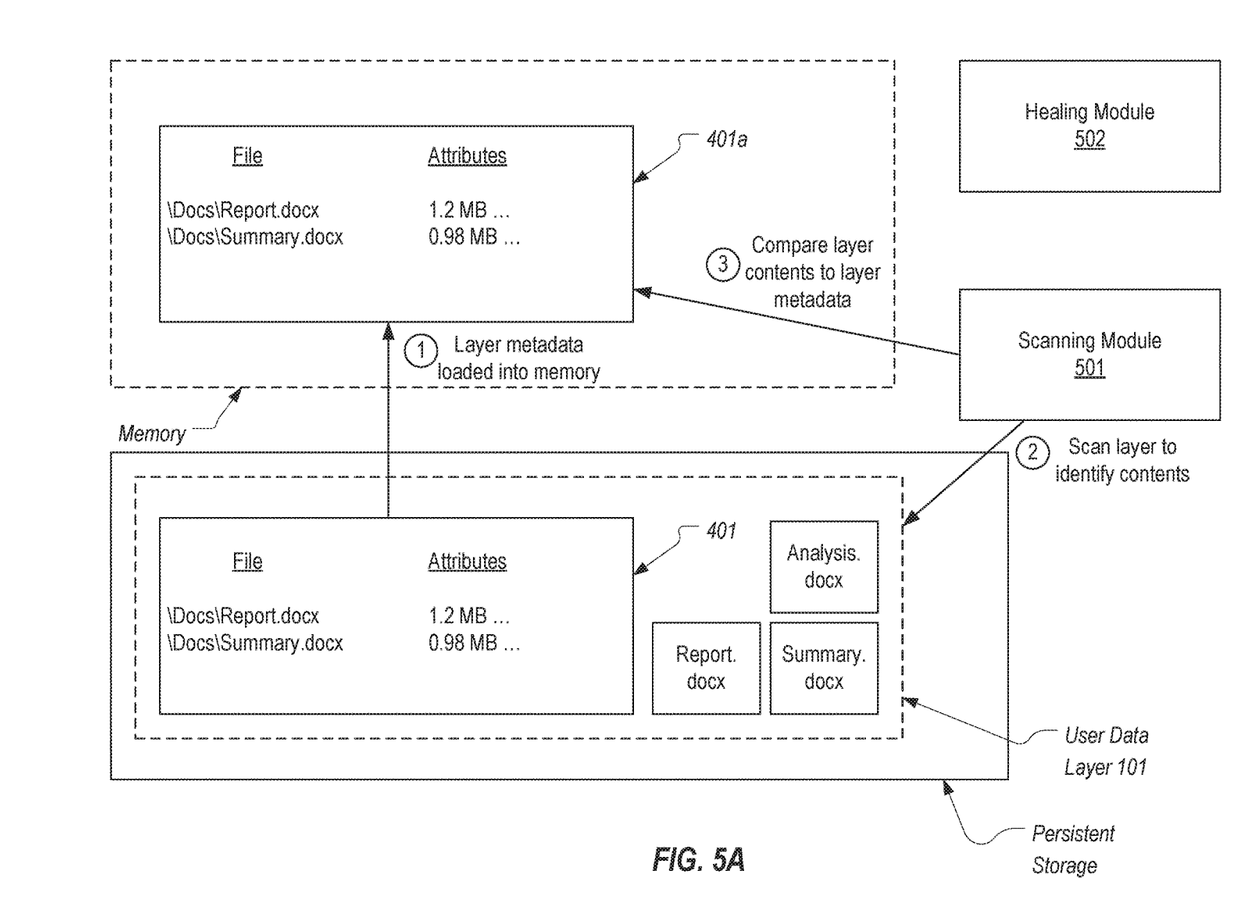
FIGS. 5A-5C illustrate a process for self-healing the layer metadata.
Figure 5B:
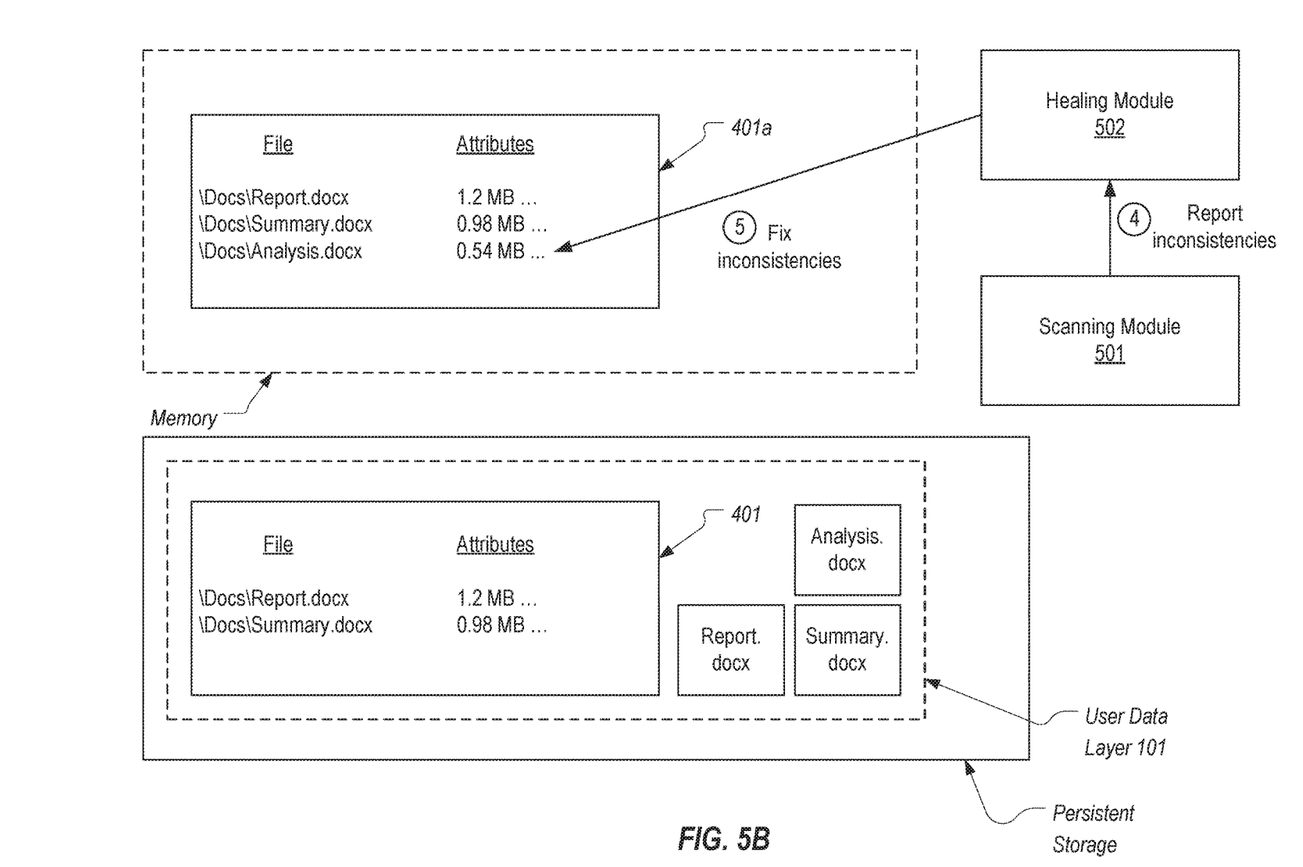
Figure 5C:
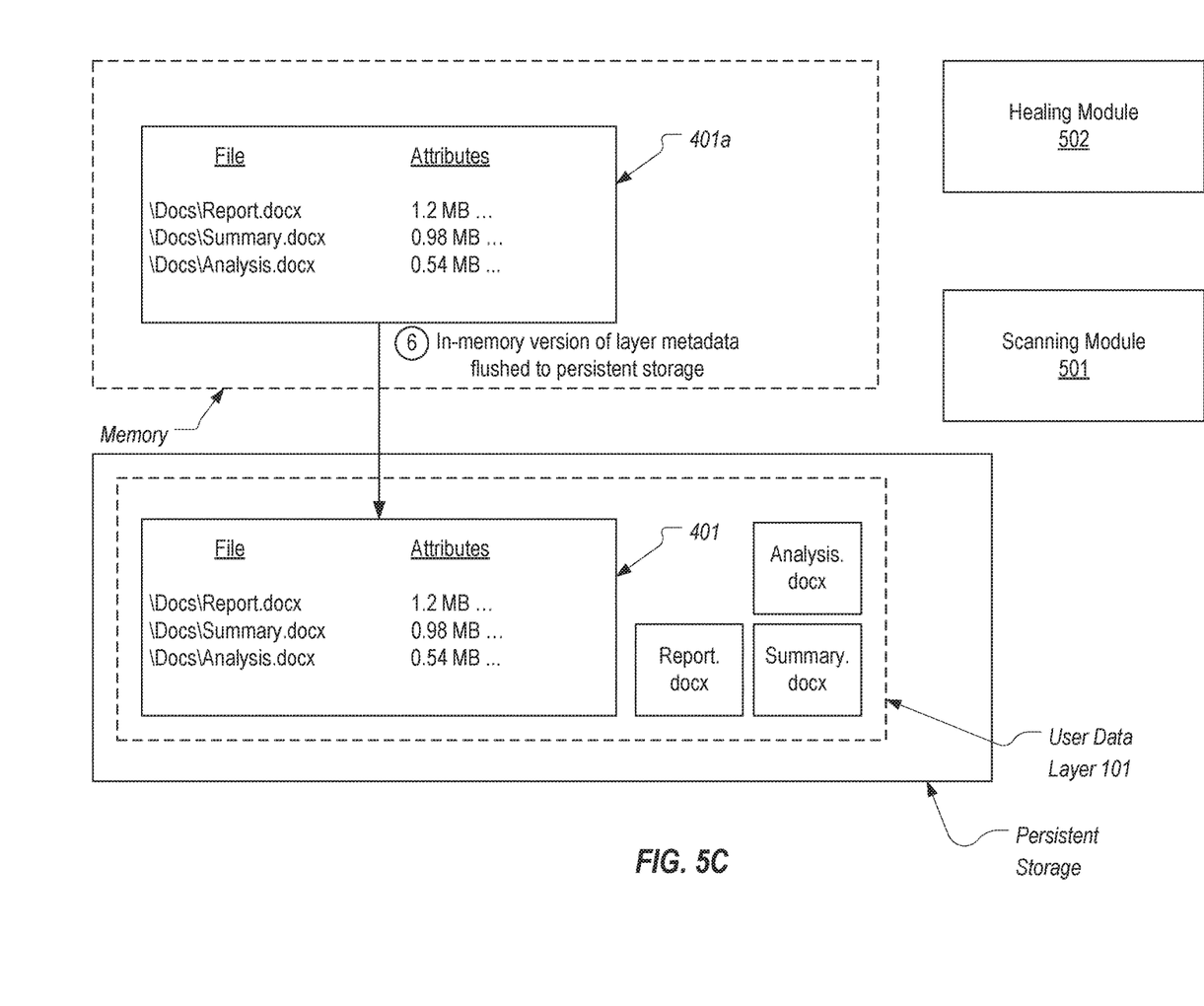

FIGS. 5A-5C illustrate how the layering system of the present invention can implement a self-healing process to fix such inconsistencies in the layer metadata. In these figures, a scanning module 501 and a healing module 502 are depicted and comprise components of the layering system. The separation of the scanning and healing modules is for illustrative purposes only and any suitable computing construct could be employed to provide the following functionality.

In some embodiments, the process depicted in FIGS. 5A-5C can be implemented on a layer anytime the layer is mounted such that the layer metadata is checked for inconsistencies as part of the mounting process. This will ensure that any inconsistencies can be fixed upon mounting the layer. Accordingly, in FIG. 5A, step 1 illustrates that layer metadata 401 is loaded from persistent storage into memory thereby creating an in-memory version 401a of the layer metadata. Next, to ensure that layer metadata 401 is accurate, in step 2, scanning module 501 can scan user data layer 101 to identify the contents of the layer (e.g., which files its contains, attributes of such files, etc.). Using the results of this scan, in step 3, scanning module 501 can verify whether there are any inconsistencies between the contents of the layer and the layer metadata. In this example, scanning module 501 will detect the presence of the Analysis.docx file in user data layer 101 (or in the E: partition) and also detect the lack of metadata identifying the Analysis.docx file in layer metadata 401. Therefore, after step 3, scanning module 501 will have determined any inconsistencies within layer metadata 401.

FIG. 5B then shows that, in step 4, scanning module 501 specifies any inconsistencies to healing module 502. In this example, step 4 would include specifying that layer metadata 401 does not include metadata for the Analysis.docx file. In response and in step 5, healing module 502 can correct any inconsistency. For example, healing module 502 can add metadata to the in-memory version 401*a* of layer metadata 401 which indicates that the Analysis.docx file is stored within the Docs folder and that the file has a file size of 0.54 MB. Finally, in step 6 as depicted in FIG. 5C, the in-memory version 401*a* will be flushed to persistent storage as part of the normal flushing process. In this way, the self-healing of the layer metadata is carried out.

As alluded to above, there are many scenarios that may result in layer metadata inconsistencies. Regardless of how the inconsistencies are caused, the self-healing process can be implemented to correct them. For example, in the Windows 8.1 operating system, transaction files that are specific to Windows 8.1 are employed to represent changes to a registry hive. These transaction files are then periodically committed to the registry hive. Assuming that a registry hive is employed to store the layer metadata, if the user were to log off of Windows 8.1 prior to the transaction files being committed, the registry hive would not reflect the changes. This would not be a problem if the user subsequently logged back in to Windows 8.1 since the transaction files would still exist on the layer and could then be processed after the layer is mounted.

However, if the user instead logged into Windows 7, the layer would be mounted to Windows 7. Windows 7, because it does not employ the Windows 8.1 specific transaction files, would simply discard the transaction files which would result in the changes to the layer metadata never being committed to the registry hive. In other words, by logging in to Windows 7 while the layer includes uncommitted Windows 8.1 transaction files, the inconsistent state of layer metadata depicted in FIG. 4C could be reached.

However, in accordance with the techniques of the present invention, even if the user logs into Windows 7 to thereby cause layer metadata inconsistencies, the inconsistencies can be immediately repaired in accordance with the process depicted in FIGS. 5A-5C. In this way, the present invention facilitates layering by furthering the separation between the various types of layers.

In some cases, healing module 502 may determine that it is not possible to fix an inconsistency in the layer metadata. In such cases, the layering system may roll back the layer metadata to an earlier consistent state. To facilitate such roll backs, the layering system may maintain appropriate logs of changes that are made to the layer metadata and/or contents of the layer.

Figure 6:
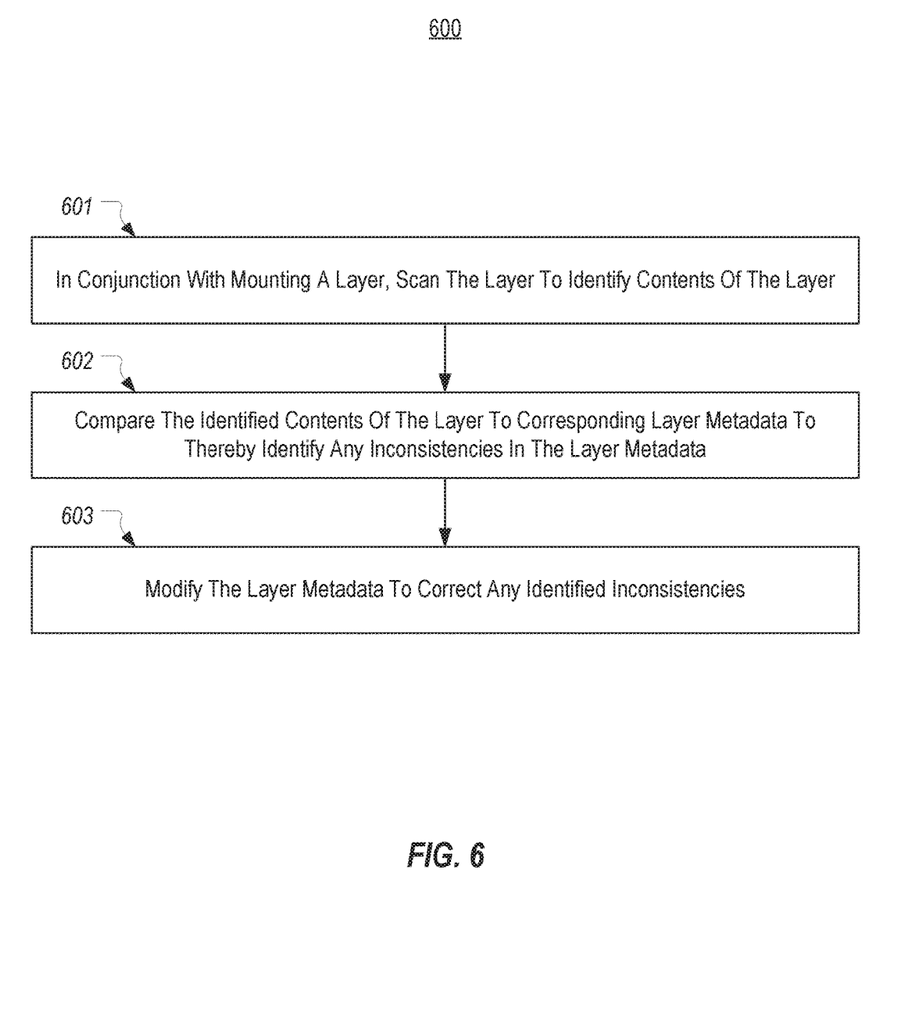
FIG. 6 provides a flowchart of an example method for implementing the self-healing of layer metadata in a layering system.

FIG. 6 provides a flowchart of an example method 600 for implementing the self-healing of layer metadata in a layering system. Method 600 could be implemented on a computing device that includes a layering system that defines layers to separately store different resources. Each layer can include layer metadata which identifies contents of the layer. The layering system can present the contents of the layer based on the corresponding layer metadata.

Method 600 includes an act 601 of scanning a layer to identify contents of the layer in conjunction with mounting the layer. For example, scanning module 501 can scan user data layer 101 when user data layer 101 is mounted.

Method 600 includes an act 602 of comparing the identified contents of the layer to corresponding layer metadata to thereby identify any inconsistencies in the layer metadata. For example, scanning module 501 can compare the identified contents of user data layer 101 to layer metadata 401.

Method 600 includes an act 603 of modifying the layer metadata to correct any identified inconsistencies. For example, healing module 502 can modify layer metadata 401.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method performed by a learning system, for implementing the self-healing of layer metadata, the method comprising:

mounting, by a layering system, a layer a first time, the layer storing a plurality of files and layer metadata, the layer metadata comprising a data structure that is separate from each of the plurality of files, the layer metadata identifying each of the plurality of files stored on the layer, the layering system being configured to employ the layer metadata stored on the layer to modify input/output requests that target the plurality of files stored on the layer;

in conjunction with mounting the layer, loading the layer metadata into memory to create an in-memory version of the layer metadata;

while the layer is mounted, causing one or more additional files to be stored on the layer;

in conjunction with causing the one or more files to be stored on the layer, updating the in-memory version of the layer metadata to identify the one or more additional files that have been stored on the layer;

in conjunction with the layer being unmounted, failing to commit the updates to the in-memory version of the layer metadata to the layer metadata stored on the layer such that the layer metadata stored on the layer does not identify the one or more additional files even though the one or more additional files were stored on the layer;

in conjunction with mounting the layer a second time, scanning the layer to identify that the one or more additional files are stored on the layer;

determining that the layer metadata stored on the layer does not identify the one or more additional files even though the one or more additional files are stored on the layer; and updating the layer metadata stored on the layer to identify each of the one or more additional files.

2. The method of claim 1, wherein the layer comprises a partition.

3. The method of claim 1, wherein the layer is one of a user data layer, an application layer, or an operating system layer.

4. The method of claim 1, wherein the layer metadata identifies one or more of names of files stored on the layer, names of directories defined on the layer, contents of the directories, or attributes of the files stored on the layer.

5. The method of claim 1, wherein the layer metadata identifies one or more of rename targets or deleted files.

6. The method of claim 1, further comprising:
while the layer is mounted the first time, causing a particular file to be deleted from the layer;
in conjunction with causing the particular file to be deleted from the layer, updating the in-memory version of the layer metadata to identify that the particular file has been deleted from the layer;
in conjunction with mounting the layer the second time, scanning the layer to determine that the particular file is not stored on the layer even though the layer metadata identifies that the particular file is stored on the layer; and
updating the layer metadata to identify that the particular file has been deleted from the layer.

7. The method of claim 1, wherein determining that the layer metadata does not identify the one or more additional files includes identifying a lack of an indication in the layer metadata that the one or more additional files exist; and
wherein updating the layer metadata to identify each of the one or more additional files includes adding the indication to the layer metadata.

8. The method of claim 7, wherein adding the indication to the layer metadata includes adding attributes of each of the one or more additional files to the layer metadata.

9. The method of claim 1, further comprising:
while the layer is mounted the first time, causing attributes of a particular file stored on the layer to be modified;
in conjunction with causing the attributes to be modified, updating the in-memory version of the layer metadata to identify the modified attributes;
in conjunction with mounting the layer the second time, scanning the layer to identify the modified attributes of the particular file;
determining that the layer metadata fails to identify the modified attributes of the particular file; and
updating the layer metadata to identify the modified attributes of the particular file.

10. The method of claim 1, wherein the layer metadata is stored on the layer.

11. The method of claim 1, wherein the layer metadata defines a path to each file stored on the layer.

12. The method of claim 11, wherein the paths defined in the layer metadata are employed by a layering file system filter driver to reroute file system operations.

13. The method of claim 1, further comprising:
in conjunction with mounting the layer a subsequent time, identifying inconsistencies between content stored on the layer and the layer metadata; and
rolling back a portion of the layer metadata to an earlier state.

14. The method of claim 1, wherein the layer metadata is stored on the layer as a registry hive, and wherein updating the in-memory version of the layer metadata to identify the one or more additional files that have been stored on the layer comprises causing one or more transaction files to be created that identify the creation of the one or more additional files, and wherein failing to commit the updates to the in-memory version of the layer metadata to the layer metadata stored on the layer comprises failing to commit the one or more transaction files to the registry hive stored on the layer.

15. The method of claim 14, wherein the layer is mounted the first time using a first operating system that employs the one or more transaction files to update registry hives, and is mounted the second time using a second operating system that does not employ the transaction files to update registry hives.

16. The method of claim 1, wherein causing the one or more additional files to be stored on the layer comprises intercepting a file create request that would cause the one or more additional files to be stored on a different layer and modifying the file create request to cause the one or more additional files to be stored on the layer.

17. The method of claim 16, wherein updating the in-memory version of the layer metadata to identify the one or more additional files that have been stored on the layer comprises creating, for each of the one or more additional files, a mapping between a path on the different layer where the corresponding file would have been stored if the file create request had not been modified and a path on the layer where the corresponding file is stored.

18. One or more computer storage media storing computer executable instructions which when executed by one or more processors implement a layering system that is configured to perform a method for implementing the self-healing of layer metadata, the method comprising:
mounting, by the layering system, a layer a first time, the layer storing a plurality of files and layer metadata, the layer metadata comprising a data structure that is separate from each of the plurality of files, the layer metadata identifying each of the plurality of files stored on the layer, the layering system being configured to employ the layer metadata stored on the layer to modify input/output requests that target the plurality of files stored on the layer;

in conjunction with mounting the layer, loading the layer metadata into memory to create an in-memory version of the layer metadata;

while the layer is mounted, causing one or more additional files to be stored on the layer;

in conjunction with causing the one or more files to be stored on the layer, updating the in-memory version of the layer metadata to identify the one or more additional files that have been stored on the layer;

in conjunction with the layer being unmounted, failing to commit the updates to the in-memory version of the layer metadata to the layer metadata stored on the layer such that the layer metadata stored on the layer does not identify the one or more additional files even though the one or more additional files were stored on the layer;

in conjunction with mounting the layer a second time, scanning the layer to identify that the one or more additional files are stored on the layer;

determining that the layer metadata stored on the layer does not identify the one or more additional files even though the one or more additional files are stored on the layer; and updating the layer metadata stored on the layer to identify each of the one or more additional files.

19. The computer storage media of claim 18, wherein the method further comprises:

while the layer is mounted the first time, causing a particular file to be deleted from the layer;

in conjunction with causing the particular file to be deleted from the layer, updating the in-memory version of the layer metadata to identify that the particular file has been deleted from the layer;

in conjunction with mounting the layer the second time, scanning the layer to determine that the particular file is not stored on the layer even though the layer metadata identifies that the particular file is stored on the layer; and updating the layer metadata to identify that the particular file has been deleted from the layer.

20. The computer storage media of claim 18, wherein the method further comprises:

while the layer is mounted the first time, causing attributes of a particular file stored on the layer to be modified;

in conjunction with causing the attributes to be modified, updating the in-memory version of the layer metadata to identify the modified attributes;

in conjunction with mounting the layer the second time, scanning the layer to identify the modified attributes of the particular file;

determining that the layer metadata fails to identify the modified attributes of the particular file; and updating the layer metadata to identify the modified attributes of the particular file.

* * * * *